UNITED STATES PATENT OFFICE 2,291,844

COATING COMPOSITIONS CONTAINING EAST INDIA RESIN

Robert C. Swain, Riverside, and Pierrepont Adams, Stamford, Conn., assignors to American Cyanamid Company, New York, N. Y., a corporation of Maine No Drawing. Application November 26, 1940, Serial No. 367,218

3 Claims. (Cl. 260—24)

This invention relates to coating compositions containing Pale East India resin and melamine-formaldehyde resins.

An object of this invention is to improve the physical and chemical properties of coating compositions containing Pale East India resin, e. g., solvent resistance, acid resistance, water resistance, etc.

Another object of this invention is to provide compositions containing Pale East India resin and compatible proportions of compatible melamine-formaldehyde resins.

These and other objects are attained by blending Pale East India resin with up to about 60% (total solids weight basis) of a melamine-formaldehyde resin which has been alkylated with an alcohol containing at least 6 carbon atoms wherein the molal ratio of formaldehyde to melamine is at least about 4:1.

The following examples in which the proportions are in parts by weight are given by way of illustration and not in limitation.

EXAMPLE 1

| | Parts |
|---|---|
| Melamine-formaldehyde resin "A" | 10 |
| Pale East India Macassar resin | 90 |

A composition containing these ingredients is prepared by admixing 20 parts of melamine-formaldehyde resin "A" solution (50% resin) with 360 parts of "Pale East India resin stock solution" (containing 25% of Pale East India Macassar resin and 75% of toluene). Films of the composition are applied to metal objects and baked at a temperature of about 135° C. for about one-half hour. The product is a hard, transparent coating having good film strength.

EXAMPLE 2

| | Parts |
|---|---|
| Melamine-formaldehyde resin "A" | 50 |
| Pale East India Macassar resin | 50 |

A composition containing these ingredients is prepared by admixing 100 parts of melamine-formaldehyde resin "A" solution (50% resin) with 200 parts of "Pale East India resin stock solution." Films of the composition are applied to metal objects and baked at a temperature of about 135° C. for about one-half hour. A clear, tough film is formed.

EXAMPLE 3

| | Parts |
|---|---|
| Melamine-formaldehyde resin "B" | 25 |
| Pale East India Macassar resin | 75 |

A composition containing these ingredients is prepared by admixing 50 parts of melamine-formaldehyde resin "B" solution (50% resin) with 300 parts of "Pale East India resin stock solution." Films of the composition are applied to metal objects and baked at a temperature of about 135° C. for about one-half hour. The product formed is a very hard, clear coating.

*Preparation of melamine-formaldehyde resin "A"*

| | Parts |
|---|---|
| Melamine (1 mol) | 126 |
| Formalin (5 mols) (37% formaldehyde in water) | 405.5 |
| n-Hexyl alcohol | 500 |
| Methyl alcohol | 200 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 80–85° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. This solution is essentially a hexylated resin in hexyl alcohol, all or nearly all of the methanol having been eliminated from it during the distillation. The resulting resin solution may be diluted to about 50% solids with any desired solvent or diluent, e. g., xylene.

*Preparation of melamine-formaldehyde resin "B"*

| | Parts |
|---|---|
| Melamine-formaldehyde (molal ratio 1:4) spray-dried powder | 200 |
| 2-ethyl hexanol | 280 |
| n-Butanol | 320 |
| Methyl acid phosphate | 4 |

The melamine-formaldehyde condensation product is obtained by refluxing melamine and formalin (37% formaldehyde in water) in the molal ratio of 1:4 at a pH of about 7-9 for about 3 hours and then spray-drying.

The spray-dried melamine-formaldehyde powder, octanol, butanol and methyl acid phosphate are heated to about 100-105° C. in 30 minutes and refluxed about 30 minutes. This solution is vacuum concentrated at about 50-70° C. to form a product containing about 50% solids.

Alkylated melamine-formaldehyde resins may be produced in accordance with the procedures outlined above, as well as in any other suitable manner. Aqueous syrups of melamine-formaldehyde resins may be first produced and then alkylated either simultaneously with dehydration or subsequent to dehydration. Generally the simultaneous condensation of melamine, formaldehyde and a suitable alcohol is used because of convenience. In order to facilitate the alkylation with the higher alcohols required in the above examples, e. g., hexyl alcohols and the octanols, a low boiling alcohol such as methanol or butanol may be mixed with the higher alcohol, thereby assisting in removing the water and causing the reaction to take place readily at somewhat lower temperatures than would otherwise be required. The low boiling alcohol is removed by distillation after the reaction is completed. Another method for producing resins alkylated with a higher alcohol is to alkylate the melamine-formaldehyde resin with a low boiling alcohol such as methanol and subsequently replacing it with the desired higher alcohol, distilling out the low boiling alcohol. The condensation may be carried out either with or without an acid catalyst and in some instances basic catalysts may desirably be utilized.

The melamine-formaldehyde resins vary slightly according to minor variations in control during their production and in some instances small proportions of a suitable solvent material, e. g., toluene, benzene, xylene, turpentine, petroleum hydrocarbons, ethyl ether, etc., may be added to the original solutions of Pale East India resin and melamine-formaldehyde resin in order to produce perfectly clear solutions if such solutions are not originally obtained.

While formaldehyde has been used in the previous examples, it will be obvious that the various polymers of formaldehyde, e. g., paraformaldehyde, or substances which yield formaldehyde may be used in place of part or all of the formaldehyde.

As indicated by the above examples Pale East India resin has been found to be compatible with up to about 60% of melamine-formaldehyde resins wherein the molal ratio of formaldehyde to melamine is at least about 4:1. Melamine resins which have been alkylated with benzyl alcohol and wherein the molal ratio of formaldehyde to melamine is about 5:1 are compatible with Pale East India resin in proportions not greater than 20% of the former. While higher ratios of formaldehyde to melamine than 6:1 may be used, it is generally undesirable inasmuch as formaldehyde is lost during the curing so that usually the product in its cured condition does not contain more than about 6 mols of formaldehyde to 1 mol of melamine. The percentage composition in each instance in the last paragraph is on a total solids weight basis.

The resins may be alkylated with any of the straight chain or branched chain alcohols containing at least 6 carbon atoms. The term "alkylated melamine-formaldehyde resin" is intended to denote compositions which are reacted with an alcohol.

Our products may be plasticized with a wide variety of materials such as the alkyl phthalates, tricresyl phosphate, various alkyd resins, particularly the fatty oil acid modified alkyd resins, etc.

Various fillers, pigments dyes and lakes may be added to our compositions, e. g., lithopone, zinc oxide, titanium oxide, ferric oxide, Prussian blue, toluidine red, malachite green, mica, glass fibers, ground glass, powdered silica, etc.

Curing catalysts may be incorporated in the compositions to effect a more rapid curing of the melamine-formaldehyde resins or to enable the resin to be cured at lower temperatures than indicated in the above examples. Such substances are, for instance, phosphoric acid, ammonium salts of phosphoric acid, etc.

Other resinous compositions may be included in various coating compositions, e. g., urea-formaldehyde resins, phenol-formaldehyde resins, alkyd resins, ethyl cellulose, cellulose acetate, nitrocellulose, etc., as well as in varnishes, especially drying oil varnishes such as those from tung oil, linseed oil, etc.

Our mixed products show improved chemical resistance, solvent resistance and are much less thermoplastic than Pale East India resin compositions not containing melamine-formaldehyde resins.

Our compositions are useful in the manufacture of paints and varnishes, as well as in lacquers, printing inks, adhesives and miscellaneous decorative and protective coating compositions. Our products are useful in coating and impregnating paper and cloth for various purposes. Our products are particularly suitable for the production of varnishes and paints having a high gloss.

The term "compatible" as used herein is intended to denote compositions, films of which are clear and homogeneous after baking.

Obviously many modifications and variations in the processes and compositions described above may be made without departing from the spirit and scope of the invention as defined in the appended claims.

We claim:

1. A coating composition containing Pale East India resin and a substantial proportion of a melamine-formaldehyde resin which has been alkylated with an alcohol containing at least 6 carbon atoms, wherein the molal ration of formaldehyde to melamine is at least about 4:1 and wherein the weight ratio of melamine-formaldehyde resin to East India resin is up to about 3:2.

2. A coating composition containing Pale East India resin and a substantial proportion of a melamine-formaldehyde resin which has been alkylated with n-hexyl alcohol wherein the molal ratio of formaldehyde to melamine is at least about 4:1 and wherein the weight ratio of melamine-formaldehyde resin to East India resin is up to about 3:2.

3. A coating composition containing Pale East India resin and a substantial proportion of a melamine-formaldehyde resin which has been alkylated with 2-ethyl hexanol wherein the molal ratio of formaldehyde to melamine is at least about 4:1 and wherein the weight ratio of melamine-formaldehyde resin to East India resin is up to about 3:2.

ROBERT C. SWAIN.
PIERREPONT ADAMS.